United States Patent [19]

Telchuk

[11] Patent Number: 5,741,178

[45] Date of Patent: Apr. 21, 1998

[54] REDUCING AREA, INCREASING VELOCITY PAINT BOOTH STRUCTURE AND METHOD

[75] Inventor: Steve E. Telchuk, Mundelein, Ill.

[73] Assignee: Binks Manufacturing Company, Franklin Park, Ill.

[21] Appl. No.: 660,806

[22] Filed: Jun. 7, 1996

Related U.S. Application Data

[63] Continuation of Ser. No. 353,128, Dec. 9, 1994, abandoned.

[51] Int. Cl.⁶ .................................................... B05B 15/12
[52] U.S. Cl. ........................ 454/54; 118/326; 118/DIG. 7; 454/50; 454/52
[58] Field of Search ............................... 454/50, 51, 52, 454/53, 54; 118/326, 354, DIG. 7

[56] References Cited

U.S. PATENT DOCUMENTS

| | | |
|---|---|---|
| 888,119 | 5/1908 | Richards . |
| 1,054,589 | 2/1913 | Mestern . |
| 1,246,355 | 11/1917 | Thomas . |
| 1,418,731 | 6/1922 | Paasche ..................................... 454/50 |
| 1,788,956 | 1/1931 | Paasche ..................................... 454/52 X |
| 1,966,280 | 7/1934 | Bingman . |
| 2,070,578 | 2/1937 | Bowman . |
| 2,086,514 | 7/1937 | Saunders et al. . |
| 2,127,908 | 8/1938 | Fischer . |
| 2,132,826 | 10/1938 | Ludwig . |
| 2,354,674 | 8/1944 | Fisher . |
| 2,385,077 | 9/1945 | Harker et al. . |
| 2,546,259 | 3/1951 | Fenn . |
| 2,650,080 | 8/1953 | Harker et al. . |
| 2,732,909 | 1/1956 | Campbell . |
| 2,852,239 | 9/1958 | Vicard . |
| 3,050,919 | 8/1962 | Tailor . |
| 3,102,800 | 9/1963 | Bora . |
| 3,138,087 | 6/1964 | Larsson et al. . |
| 3,140,163 | 7/1964 | Hausberg . |
| 3,182,977 | 5/1965 | Erni . |
| 3,317,197 | 5/1967 | Lohner et al. . |
| 3,385,030 | 5/1968 | Letvin . |
| 3,700,389 | 10/1972 | Wanner et al. ................... 454/53 X |
| 3,725,266 | 4/1973 | Haviland . |
| 3,764,013 | 10/1973 | Eisenmann . |
| 3,795,093 | 3/1974 | Gerhard et al. . |

(List continued on next page.)

FOREIGN PATENT DOCUMENTS

| | | |
|---|---|---|
| 0089219 | 3/1982 | European Pat. Off. . |
| 438264 | 7/1991 | European Pat. Off. . |
| 595002 | 3/1934 | Germany ............................. 454/53 |
| 719996 | 6/1942 | Germany ............................. 454/50 |
| 1009635 | 6/1957 | Germany . |
| 115042 | 9/1975 | Germany . |
| 142154 | 6/1980 | Germany . |
| 3122922 | 1/1983 | Germany . |
| 209 962 | 5/1984 | Germany . |
| 3447664 | 7/1985 | Germany . |

(List continued on next page.)

OTHER PUBLICATIONS

Binks Manufacturing Company letter to PPG Industrial, Inc. dated Mar. 21, 1991.

Binks Manufacturing Company drawing Low Volume Prototype Booth for P.P.G., dated Sep. 30, 1991, Drawing No. DP #310.

Binks Manufacturing Company drawing Prototype Low Velocity Enclosed Spray Booth, dated Nov. 9, 1992, Drawing No. 25948.

(List continued on next page.)

*Primary Examiner*—Harold Joyce
*Attorney, Agent, or Firm*—Wallenstein & Wagner, Ltd.

[57] ABSTRACT

A paint booth structure and method having, in one form a specially shaped painting volume wherein the painting occurs is provided with an air flow system to carry away paint overspray and a decreasing cross-sectional area in the direction of air flow to cause an increasing velocity air flow where the painting occurs.

41 Claims, 10 Drawing Sheets

U.S. PATENT DOCUMENTS

| | | |
|---|---|---|
| 3,798,880 | 3/1974 | Arnold et al. . |
| 3,803,997 | 4/1974 | Van Raden . |
| 3,807,291 | 4/1974 | Roberts et al. . |
| 3,876,399 | 4/1975 | Saponaro . |
| 3,990,869 | 11/1976 | Forney . |
| 3,994,808 | 11/1976 | Kearney . |
| 4,045,524 | 8/1977 | Bornert . |
| 4,067,806 | 1/1978 | Mauceri . |
| 4,096,066 | 6/1978 | Kearney . |
| 4,100,066 | 7/1978 | Bloomer et al. . |
| 4,102,303 | 7/1978 | Cordier et al. . |
| 4,157,281 | 6/1979 | Burkhardt et al. . |
| 4,185,975 | 1/1980 | Scharf . |
| 4,196,023 | 4/1980 | Rowe . |
| 4,203,837 | 5/1980 | Hoge et al. . |
| 4,220,078 | 9/1980 | Walker et al. . |
| 4,222,319 | 9/1980 | Donahue . |
| 4,239,512 | 12/1980 | Dobias . |
| 4,241,646 | 12/1980 | Tsuruta et al. . |
| 4,255,232 | 3/1981 | Ries . |
| 4,294,191 | 10/1981 | Loof . |
| 4,338,364 | 7/1982 | Kennon et al. . |
| 4,425,870 | 1/1984 | Marshke . |
| 4,440,647 | 4/1984 | Puchalski . |
| 4,469,595 | 9/1984 | Napadow . |
| 4,484,513 | 11/1984 | Napadow . |
| 4,515,072 | 5/1985 | Crisp . |
| 4,567,818 | 2/1986 | Napadow . |
| 4,585,557 | 4/1986 | Turnquist . |
| 4,600,513 | 7/1986 | Mizutani et al. . |
| 4,608,064 | 8/1986 | Napadow . |
| 4,610,785 | 9/1986 | Russell . |
| 4,629,477 | 12/1986 | Geke . |
| 4,629,572 | 12/1986 | Leitz et al. . |
| 4,661,527 | 4/1987 | Seng . |
| 4,687,520 | 8/1987 | Seng . |
| 4,696,254 | 9/1987 | Spindler . |
| 4,701,220 | 10/1987 | Seng . |
| 4,708,775 | 11/1987 | McGregor et al. . |
| 4,722,791 | 2/1988 | Turnquist . |
| 4,750,919 | 6/1988 | Patzelt et al. . |
| 4,814,092 | 3/1989 | Patzelt . |
| 4,815,397 | 3/1989 | Minnie, Jr. . |
| 4,867,872 | 9/1989 | Russell et al. . |
| 4,891,422 | 1/1990 | Waldmann . |
| 4,925,563 | 5/1990 | Omori et al. . |
| 4,957,633 | 9/1990 | Suutarinen . |
| 4,980,030 | 12/1990 | Johnson et al. . |
| 5,022,992 | 6/1991 | Looker . |
| 5,062,963 | 11/1991 | Marcinkowski et al. . |
| 5,105,393 | 4/1992 | Russell et al. . |
| 5,160,628 | 11/1992 | Gerace et al. . |
| 5,173,118 | 12/1992 | Josefsson ................................ 454/52 X |
| 5,223,141 | 6/1993 | Brown et al. . |
| 5,254,256 | 10/1993 | Zuerner et al. . |
| 5,254,263 | 10/1993 | Gerace et al. . |

FOREIGN PATENT DOCUMENTS

| | | |
|---|---|---|
| 3408474 | 9/1985 | Germany . |
| 3739160 | 3/1989 | Germany . |
| 4212711 | 10/1993 | Germany . |
| 53-99282 | 8/1978 | Japan . |
| 56-70871 | 6/1981 | Japan . |
| 56-70872 | 6/1981 | Japan . |
| 57-136993 | 8/1982 | Japan . |
| 58-291 | 1/1983 | Japan . |
| 62-146700 | 6/1987 | Japan . |
| 3-213190 | 9/1991 | Japan . |
| 3-242283 | 10/1991 | Japan . |
| 4-250894 | 7/1992 | Japan . |
| 1669505 | 8/1991 | U.S.S.R. . |
| 91/00250 | 1/1991 | WIPO . |

OTHER PUBLICATIONS

Binks Manufacturing Company drawing Prototype Low Velocity Enclosed Spray Booth, dated Nov. 9, 1992, Drawing No. 25948 (second drawing, same date).

Binks Manufacturing Company drawing Modified Prototype Low Velocity Enclosed Spray Booth, dated Oct. 13, 1993, Draw. No. 25948.

Binks Manufacturing Company drawing Low Velocity Enclosed Spray Booth Right Hand Booth Assembly, dated Feb. 8, 1994, Drawing No. 32939.

REDUCING AREA, INCREASING VELOCITY PAINT BOOTH STRUCTURE AND METHOD

This is a continuation of application Ser. No. 08/353,128 abandoned filed on Dec. 9, 1994.

This invention relates to paint booths and painting methods, and more particularly to paint spray booths and painting methods utilizing reduced air flow.

BACKGROUND OF THE INVENTION

Heretofore it has been known to provide paint booths with and painting methods utilizing a generally constant air flow velocity within the booth to carry away paint overspray. For example, see U.S. patent application Ser. No. 07/955,390, filed Oct. 1, 1992, entitled Apparatus and Method for Airborne Particulate Booth and assigned to Binks Manufacturing Company. Generally one way to achieve such constant air flow velocity was to provide both generally uniform air flow in a booth and to provide the booth with a uniform or constant cross-sectional area construction in the zone of the air flow throughout the booth, and at least particularly in the region or locale where the articles being painted are to be located. While there has been some variation from such uniform cross-sectional area construction to accommodate collection of overspray bearing air or the provision of inclined water washed subfloors, such cross-sectional variations are generally not in the locations where the articles are being painted and the painting operation actually occurs. Additionally some booths have been provided with tapered walls for structural reasons and/or to accommodate special painting equipment. In the former case the booth's cross-sectional area in the direction of air flow actually increased so that the air velocity decreased and not increased, see U.S. Pat. No. 5,042,420. In the latter case, a portion of the booth in front of the locale where the articles are to be painted is made larger in cross-section to accommodate painting equipment, such as automatic robots and/or their servicing, but such booths are generally otherwise substantially constant in cross-sectional area where the articles are to be painted and the painting operation actually occurs.

In operating a paint spray booth generally there is provided an air flow from behind the painter and/or painting equipment and the part or article being painted into some type paint overspray recovery or air cleaning or overspray eliminating section. This air flow path is chosen to at least try to keep overspray off the paint operator and or painting equipment itself and to keep off or minimize overspray, as contrasted to the intended spray of paint, on the yet unpainted portions of the article. The air flow then bearing the overspray is usually drawn into the booth's air treating, cleaning or eliminating section. If an initial air flow velocity is chosen to handle the overspray generated at the front of the article being painted or at the start of painting, that velocity can prove insufficient as the air flow moves past the article and is required to carry ever increasing amounts of overspray. One reason for this inadequacy is that as the various particles of overspray move past the article being painted, the particles tend to collect, combine and agglomerate into larger particles which are heavier and more difficult for this initial air velocity to control and/or carry. In the past the way to address, actually cover up, this problem, was to increase the initial air velocity to a sufficiently high value to handle any subsequent or downstream overspray problem. Of course, when the air velocity is increased for a given area, the total quantity of air flow used in the booth also must increase. Thus, more total air flow is used. It is a well known fact that the expense involved in treating the air flow used in a paint booth and clean it up after passing through the booth to ever tightening environmental standards, increases with quantity air flow. A rough rule of thumb for such costs in 1994 is about $30,000 per 1,000 cfm. For example, on a 100,000 cfm air flow booth, the cost would be about $3,000,000. Thus, even a 10% reduction in total air flow could result in significant savings. Thus, the solutions of increased air velocity previously used resulted in increased total air flow, increased expense, and a less than a optimum solution to an ever increasing environmental challenge.

SUMMARY OF THE INVENTION

The paint booth and method of the present invention utilizes a low initial air velocity of just a sufficient magnitude to handle the initial overspray, and in order to handle the additional overspray picked up, downstream or along the way, the air velocity in the booth itself is caused to increase without increasing the total air flow. In fact, in the present invention the total air flow may be reduced to 40% to 60% of that for a conventional prior art booth, while still maintaining adequate air flow. Preferably this increase in air flow velocity is provided by decreasing the cross-sectional area of the booth in or along the direction of air flow in at least the locale or area where the articles are to be painted and the actual painting depositing operation occurs. This decrease in area can be 60% to 40% so that though the total air flow is reduced, the velocity of the air is increased. Thus, the total quantity of air flow can be reduced and/or kept at a minimum, reducing initial and operating costs while giving as good or better control of overspray because the air's velocity can be accelerated to a higher level as needed by preferably geometry changes in the booth to control overspray. The unique desired increased velocity is achieved by constructing the booth with a decreasing cross-sectional area in or along the direction of the air flow at least in the locale where the painting occurs. The desired area or geometry changes can be fixed or variable, say using a movable baffle to effect a variable change in cross-sectional area. That is, the booth could have one or more movable or adjustable walls or elements to make the geometry change needed, e.g. a moveable wall which could be fixed in one or more portions to give the desired area reduction. The booth could be constructed to achieve say a 50% area reduction or adjustable to have say a 40% to 60% change. The desired decreasing cross-sectional area, and resulting increasing air flow velocity are achieved by constructing the booth with changes in the cross-section of the interior boundaries such as one or more of the walls, ceiling or floor of straight but arched, tapered or curved construction and/or any combination of such walls, ceiling or floor. In existing booths such changes can be accomplished by providing some type of interior baffle, wing or filler portion to achieve the desired decreasing cross-sectional area and, hence, velocity increasing cross-section profiles.

Since the quantity of air used by a booth and/or method of the present invention is substantially reduced, say 40%, 50% or even 60%, it is easier and less expensive to more intensively and/or extensively treat the discharged air to achieve a higher discharged air quality. With the booth and method of the present invention total air flow quantity can be very substantially reduced (compared to prior art conventional uniform cross-section booths), while paint overspray is easily controlled, discharged particulate reduced and painting quality improved.

It is an object of the present invention is to provide a paint booth and painting method utilizing a minimum velocity and a minimum quantity air flow.

Another object of the present invention is to provide a paint booth and painting method which utilizes an increasing air flow velocity.

Yet another object of the present invention is to provide a paint booth and painting method utilizing decreasing cross-sectional area in the locale were the painting occurs.

A further object of the present invention is to permit a booth to use a smaller size eliminator section due to the reduced air flow resulting in substantial cost reduction.

Still another object of the present invention is to provide a paint booth and painting method which results in less expense to install and/or operate and improved air discharge and paint quality.

Still another object of the present invention is to provide a paint booth and painting method which can be built into a new booth and/or can be retrofitted to an existing booth.

These and other objects of the present invention will be apparent from the following written description and the accompanying drawings.

DESCRIPTION OF THE DRAWINGS

FIG. 16 is a top view of an tenth embodiment of booth structure and method of the present invention.

FIG. 17 is a top view of a eleventh embodiment of booth structure and method of the present invention.

FIG. 18 is a top view of a twelfth embodiment of booth structure and method of the present invention.

FIG. 19 is a top view of a thirteenth embodiment of booth structure and method of the present invention.

DESCRIPTION OF THE PREFERRED EMBODIMENTS

Figure 1:
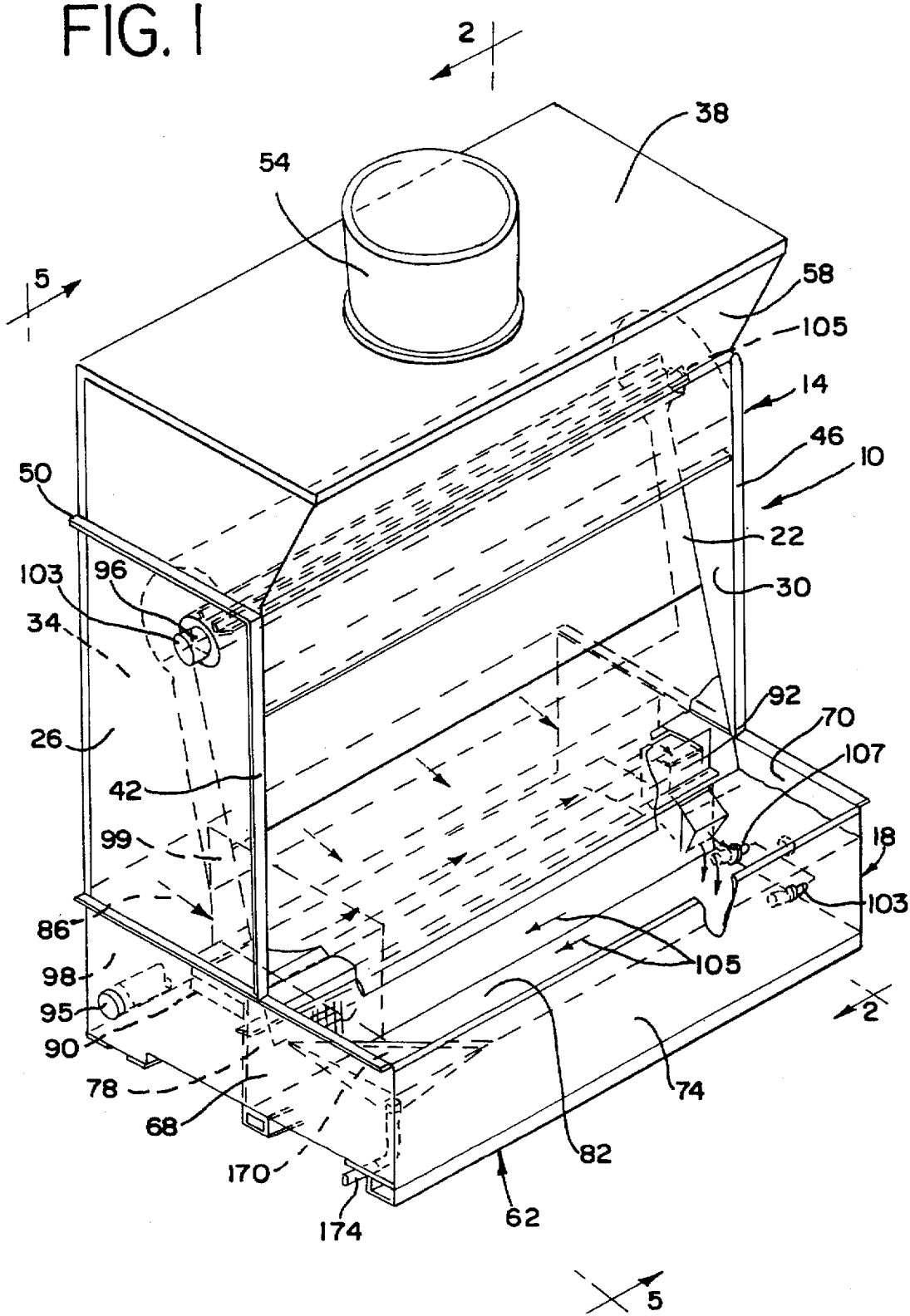
FIG. 1 is a schematic elevational view of a first embodiment of booth structure and method of the present invention.
Figure 2:
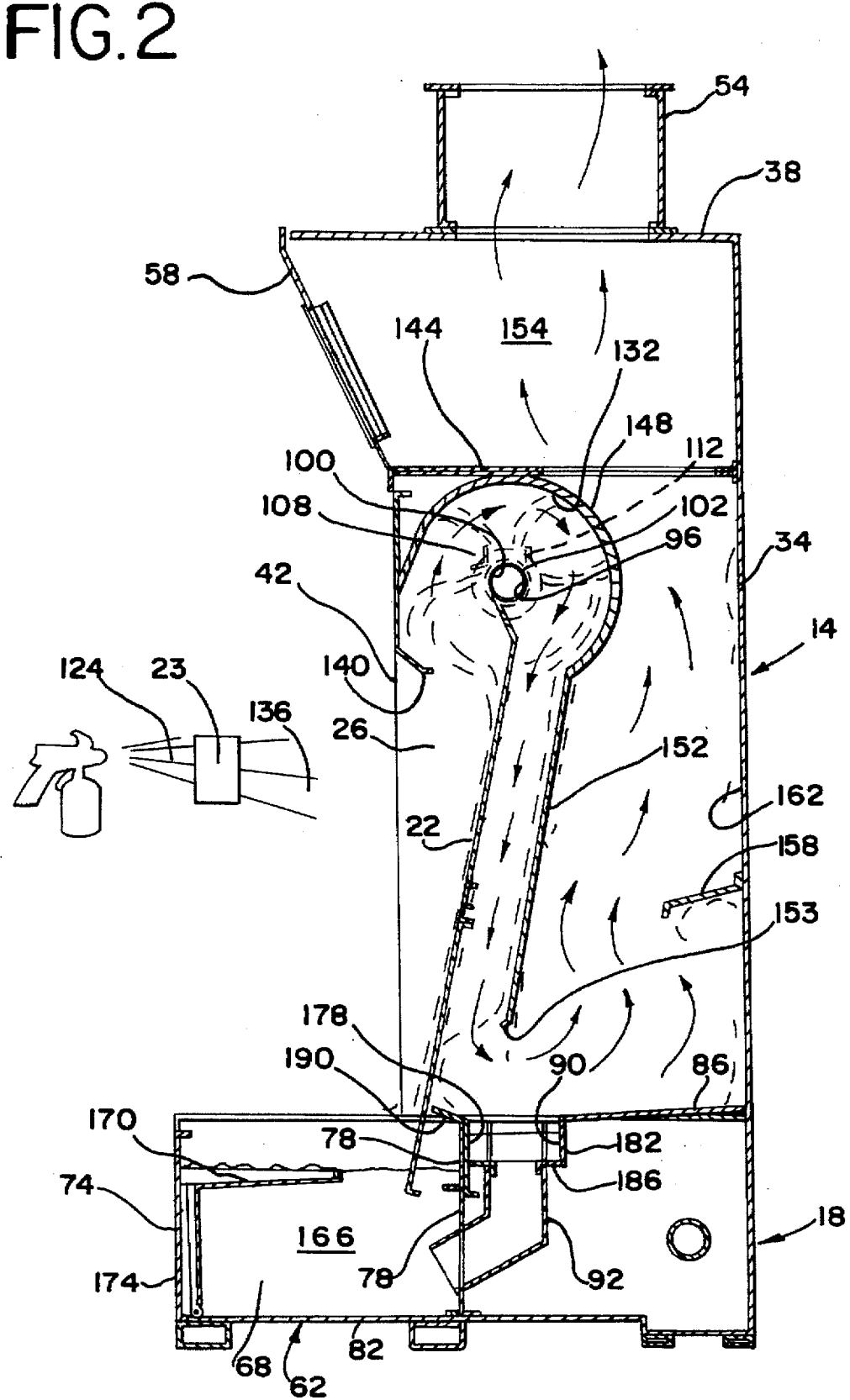
FIG. 2 is a schematic elevational view of a second embodiment of booth structure and method of the present invention.
Figure 3:
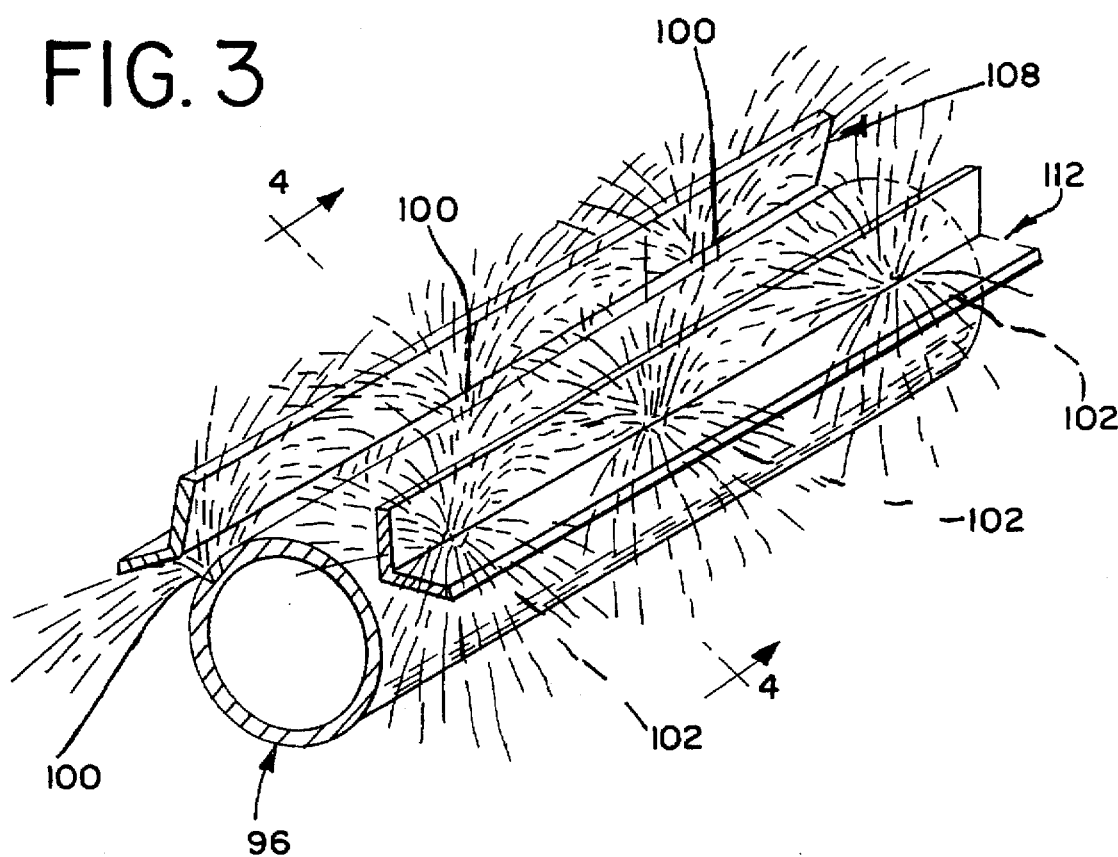
FIG. 3 is a schematic top view of a third embodiment of booth structure and method of the present invention.
Figure 4:
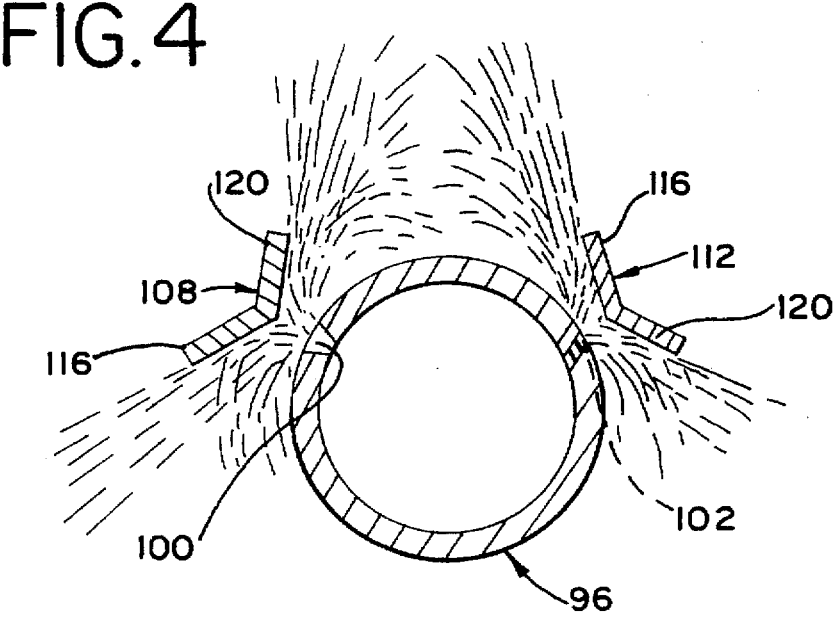
FIG. 4 is a schematic front elevational view of a fourth embodiment of booth structure and method of the present invention.
Figure 5:
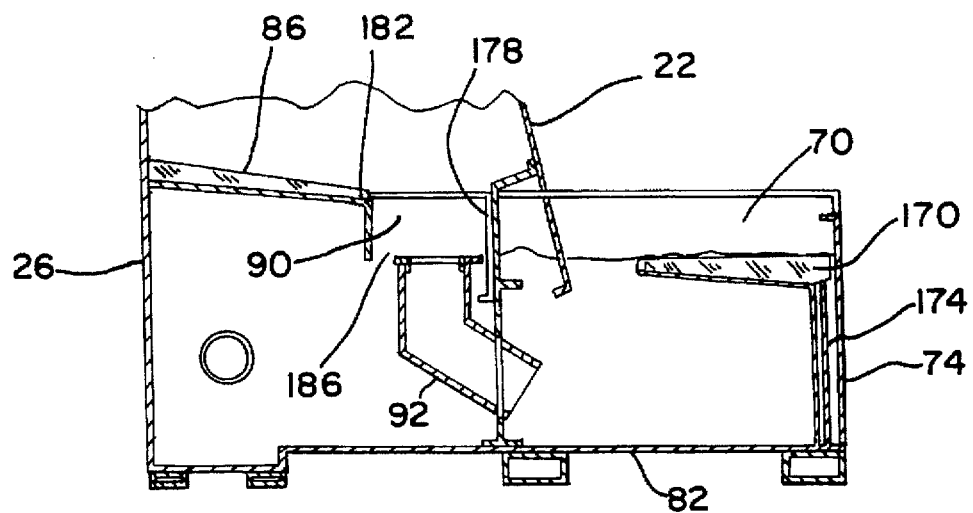
FIG. 5 is a schematic side elevational view of the booth structure of FIG. 4.
Figure 6:
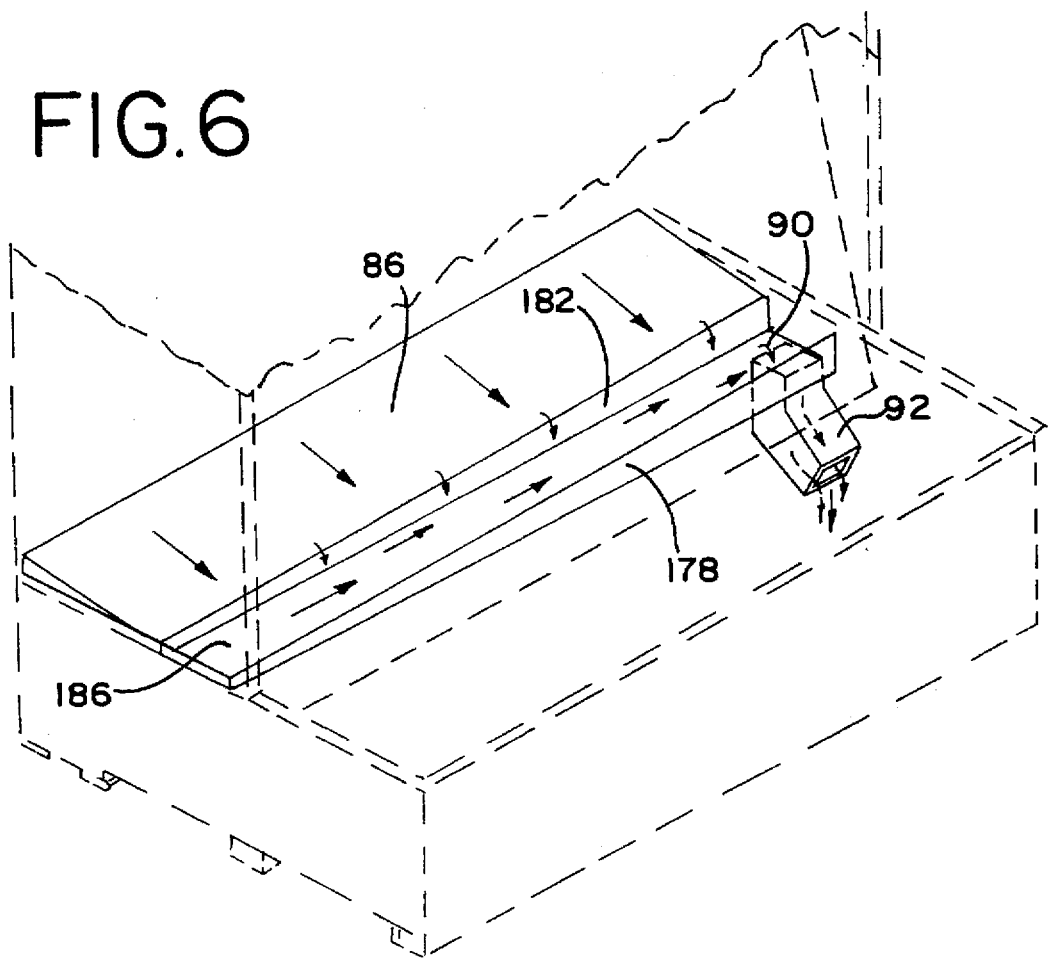
FIG. 6 is a plan view of a fifth embodiment of booth structure and method of the present invention.
Figure 7:
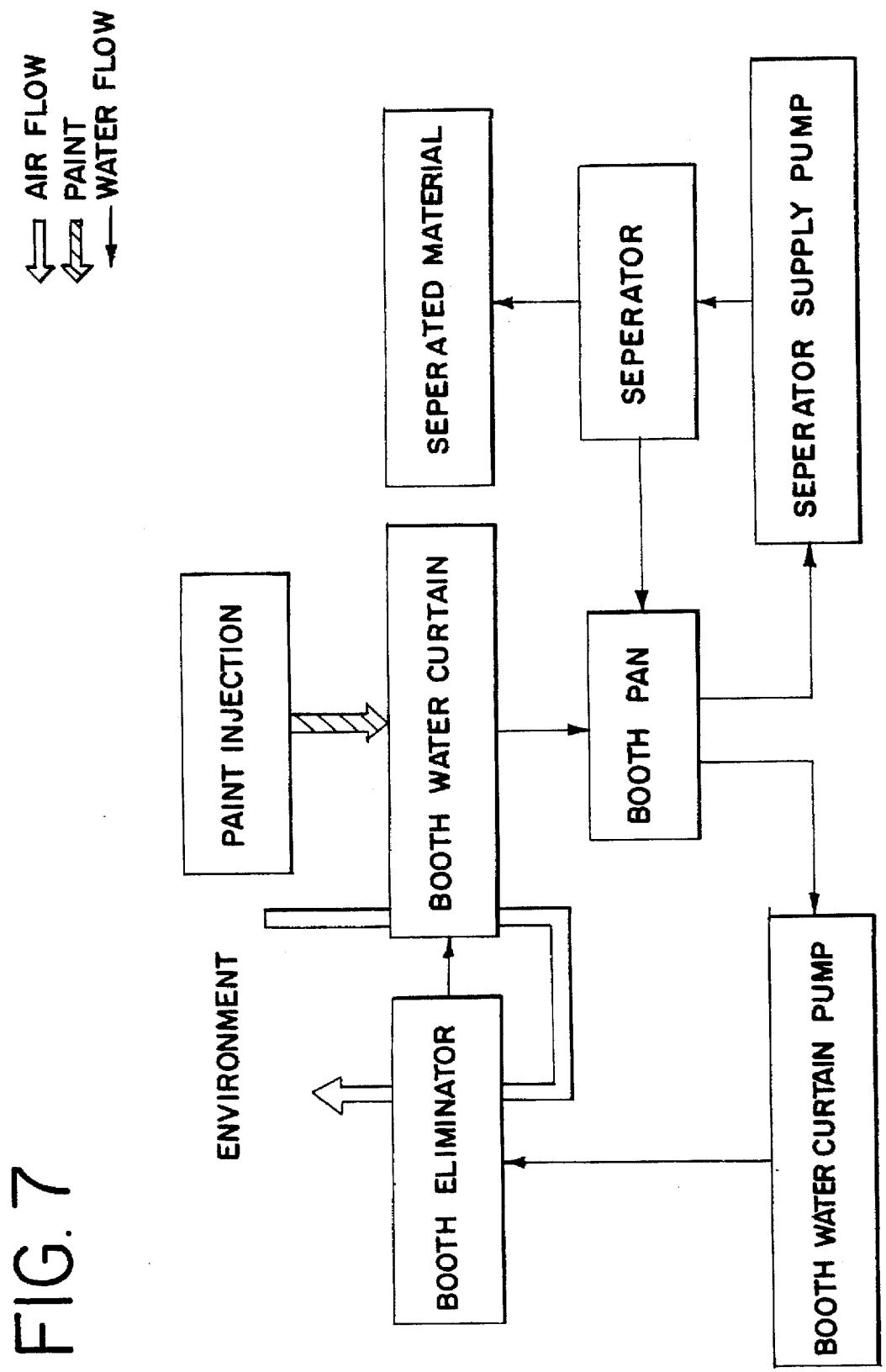
FIG. 7 is a plan view of a sixth embodiment of booth structure and method of the present invention.

Referring to the figures of the drawing, several embodiments of the method and booth structure of the present invention are shown and disclosed. The first seven embodiments are show only in rudimentary or schematic form in FIGS. 1 to 8, with a more detailed embodiments being disclosed in FIGS. 9 to 19, except for FIG. 15 which is a prior art type booth.

FIG. 1 illustrates a paint spray booth 10 having an air entering area, designated by the numeral 12 at the left side or end of FIG. 1. The air flow, schematically indicated by arrows or vectors 13, is confined by, in this instance, a straight section or wall element 14 and at least a partially sloped or tapered portion of section or wall element 16. The tapered wall 16 extends along the actual painting deposition volume or area 17, including both the paint source (e.g. spray, bell, electrostatic, automatic or robotic gun) 18 and article or articles 20 being painted. While not shown, the other sections, sides or wall elements of the booth would close off the space between the opposite walls 14 and 16 to form the booth's enclosure and interior. As is apparent, the cross-sectional area between the sections or walls 14 and 16 decreases when one moves past the taper wall 16, in a left or upstream (entrance) to right or downstream (exit) direction. In operation, air flows from the left to the right and would, of course, increase in velocity as it moves left to right past the taper wall 16, as is schematically indicated by the increased length of the air flow vectors (arrows 21). The change in velocity inversely with the change in cross-sectional area can be derived from the continuity equation. For air in a regime of incompressible flow, the product of the cross-sectional area multiplied by the average velocity at that section is a constant value for any section so that if the cross-sectional area decreases, the average velocity must increase. The increased velocity is due to the decrease in cross-sectional area, and the change in area can be selected to give the desired increase in velocity so that the overspray generated during painting can then be more easily handled. Even though the total air flow supplied compared to a prior art booth of the same type and front width is 40%, 50% and even 60%. Thus through the booth of the present invention might have a front width similar to a conventional booth of the same spraying technique, its initial velocity would be 40% to 50% to 60% less and downstream his booth of the present invention would reduce its cross-sectional area 40%, 50% or 60% to increase its velocity to that of a conventional booth of the same spray technique type. Generally the area or volume in which painting occurs is of concern and this could encompass a few feet before the spray painting equipment and a few feet downstream of the article being painted. Generally this is the area or volume where it is desired to increase the velocity and reduce cross-sectional area. Additionally, consideration must be given to keeping the spray of paint emanating from whatever painting equipment used about 2 feet or so away from any adjacent walls or structure of the booth to keep them from being coated with overspray. The foregoing parameters should permit a person reasonably skilled in the art of spray paint/powder booth designs to utilize the present invention. Further guidance can be taken from the various embodiments presented herein.

Of course, the need for increased velocity will vary according to the type or technique of painting. For example, bell electrostatic painting may utilized only a slight decrease in cross-sectional area and a slight increase in velocity and booth taper (or area change) as there is a small amount of overspray generated. HVLP (high velocity and low pressure) painting may utilize a somewhat greater decrease in area and a greater accompanying increase in velocity and booth taper as it generates somewhat more overspray. Whereas conventional spray painting with air atomization would have even a greater decrease in area and a greater increase in taper and velocity as it generates probably even more overspray. Other types of painting such as airless (hydraulic atomization) and air assisted airless may fall in between electrostatic and air atomizing techniques. Generally the amount of cross-sectional (area) decrease and the increase in taper and velocity would increase with the tendency for the particular type of painting technique or system to create overspray. But in all circumstances there would be a 40%, 50% even 60% reduction in total air flow.

Referring to FIGS. 1 to 8, the booth taper and decrease in cross-sectional area can be achieved in various ways. For example, in embodiment 10 of FIG. 1, a wall element or section, the ceiling element or section or the floor element or section could be tapered. Instead of just tapering one wall, the ceiling or floor, two of these sections or elements (indicated in the drawings by straight lines 23 or 25 or planes 27 or 29 could be tapered. See embodiments 24 or 26 and 28 in FIG. 2, 3 or 4 and 5, respectively. In fact, three, four or all sections or elements could be tapered to achieve the desired decrease in cross-sectional area and increase in air velocity at the locale or volume where the painting operation actually takes place.

Figure 8:
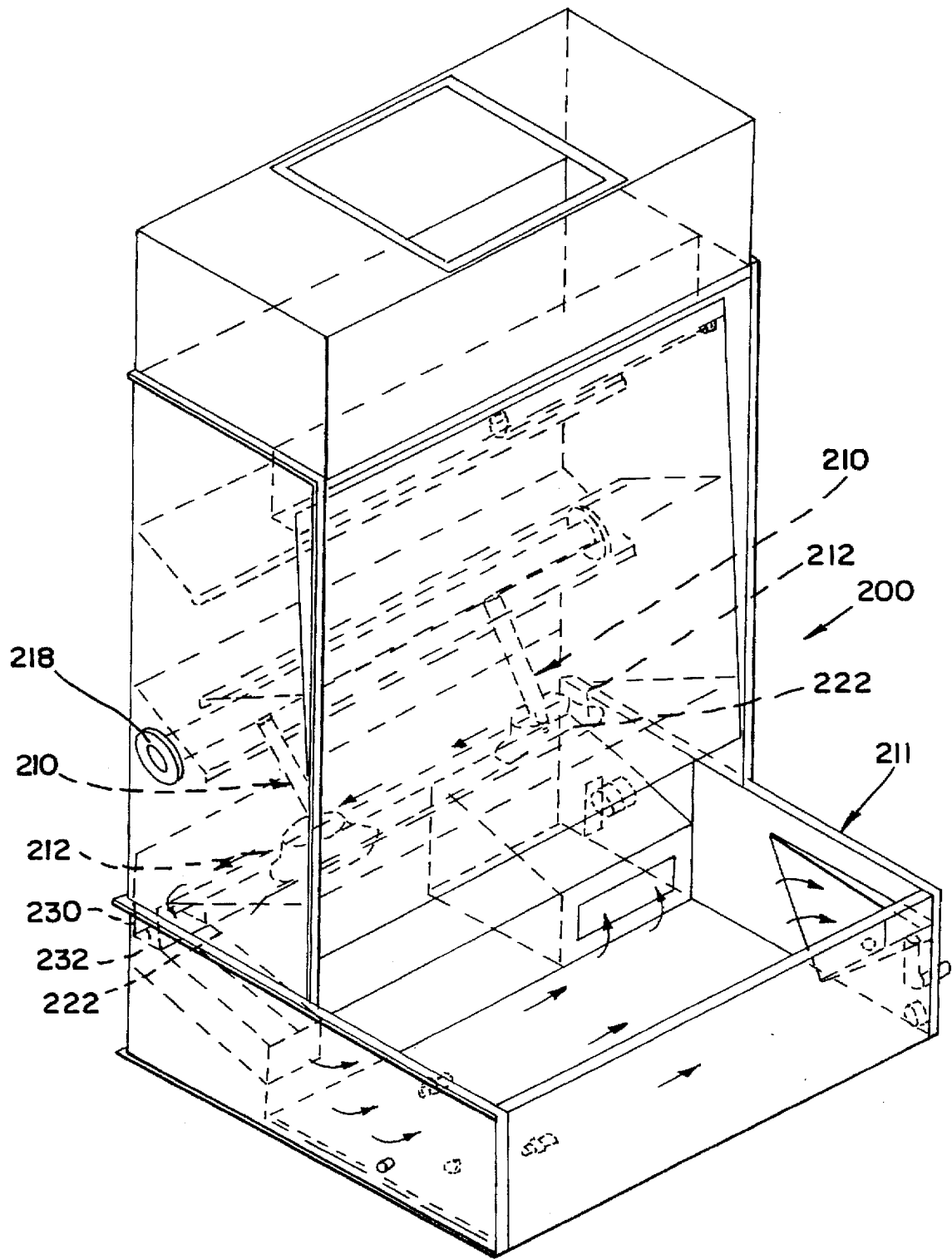
FIG. 8 is a plan view of a seventh embodiment of booth structure and method of the present invention.

While tapered or sloped walls were shown in FIGS. 1 to 5, the booth could also utilize curved walls to provide the reducing cross-sectional area and increasing velocity. For example, the walls 31 and 32 could be convex toward each other as in FIG. 6; they could be concave (see 34 and 35) toward each other as in FIG. 7 or any other curved relationship (see 36 and 37) as shown in FIG. 8. Of course, any one of these curved walls could be combined with one or more flat, tapered or sloped walls too, to give the desired decrease in cross-sectional area and accompanying increase in air flow velocity to handle the overspray. While the booth could have a generalized arrangement suitable for a range or size of objects to be painted, the present invention can also be utilized in a custom booth for painting only a particular type object, such as an example, a vehicle or as another example, an appliance.

It is believed that for the various types of spray painting the ratio or reduction in cross-sectional area in the painting section or volume (assuming the initial area was 1.00) would be on the order of:

| RATIO OF CHANGE OF CROSS-SECTIONAL AREA | | | |
|---|---|---|---|
| Painting System | High | Low | Preferred Range |
| Electrostatic Bell | 0.60 | 0.40 | 0.50 |
| HVLP | 0.60 | 0.40 | 0.50 |
| Air Assist Airless | 0.60 | 0.40 | 0.50 |
| Airless (Hydraulic Atomization) | 0.60 | 0.40 | 0.50 |
| Air Atomization | 0.60 | 0.40 | 0.50 |

Consequently, the changes of initial to later air velocity ratio would be inversely proportional to the changes in cross-sectional area ratio. Thus, assuming an entering air velocity into the painting section as 1.00 the leaving velocity would be as follows:

| VELOCITY (RATIO) | | | |
|---|---|---|---|
| Painting Type | HIGH | LOW | Preferred Range |
|  | 1.66 | 2.5 | 2 |
| Electrostatic Bell | 1.66 | 2.5 | 2 |
| HVLP | 1.66 | 2.5 | 2 |
| Air Assist Airless | 1.66 | 2.5 | 2 |
| Airless | 1.66 | 2.5 | 2 |
| Conventional Air Atomization | 1.66 | 2.5 | 2 |

While flat walls or surfaces can be sloped or tapered to achieve the desired change in area, such is done principally for economic reasons and/or ease of construction and assembly. However, it is fully within the scope of the present invention and at least some of the claims, as discussed above, to use curved or curvilinear walls to achieve the desired cross-sectional area reduction. For example, the booth, except perhaps for a flat floor (just for convenience of the painters or servicemen), could have a generally overall curvilinear or venturi shape. Such shape would also minimize the fan or blower horsepower needed to create the air flow to operate the booth.

Generally, in designing a booth of and for the method of the present invention, the booth is widest for the initial air flow over the article to be painted and where painting on the article is intended to be initiated and the cross-sectional area then reduces or tapers downstream to a smaller value where the air flow finally departs from the article and where painting of the last portion of the article takes place. Thus, for example, in the embodiments shown in FIGS. 1–8, the painting would be generally initiated on the left portion thereof and then final painting of the right portion of the article. Of course, were the article 20 itself rotated during painting, then the spray gun 18 could remain as approximately shown, instead of being moved downstream.

Thus, referring to FIG. 1 the booth would have a cross-sectional areas of 1.00 at the upstream plane A and a value of say 0.50 at the downstream plane B where essentially painting is completed or stops. The value at the further downstream plane C could be whatever the booth designer needs, the painting operation occurring essentially between planes A and B and not B and C.

Now that the booth structure and method of the present invention have been described in simple form, a more complete booth structure for carrying out the method of the present invention is described with reference to FIGS. 9 to 13.

Figure 9:
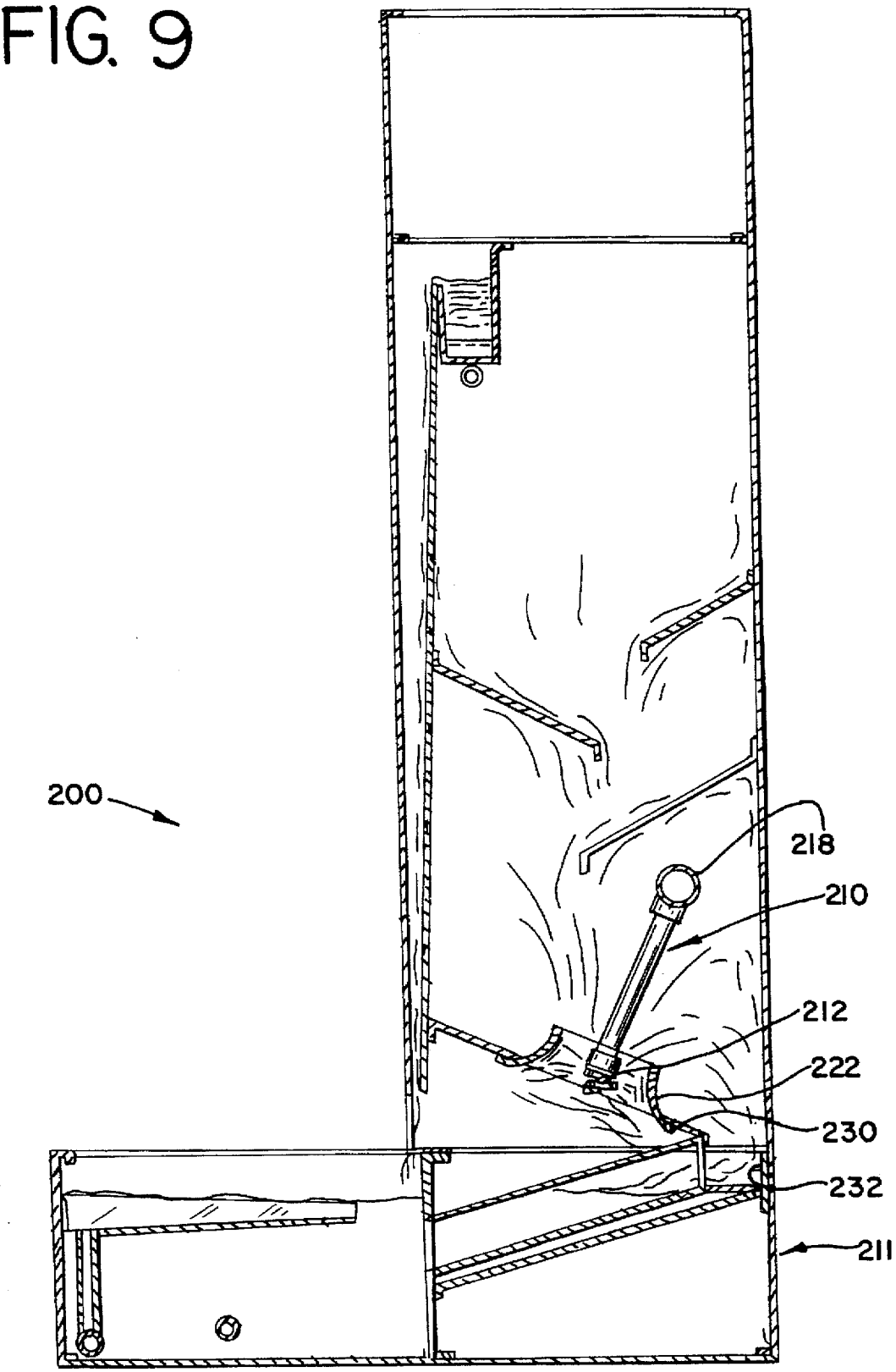
FIG. 9 is a plan view of an eighth embodiment of booth structure and method of the present invention.

Referring to FIG. 9, a large booth 50 suitable for production spray painting is shown in plan view. While such a booth could be adapted to other types of spray painting, in the present form booth, multiple head rotary, atomizing sprayer heads are used and designated collectively by the numeral 51. This booth is best suited for spraying flat panels, using HVLP technique spraying equipment. With HVLP painting the air flow velocity where the painting takes place may be say for 100 to 150 feet per minute with about 125 feet per minute being preferred. In the present instance, what we will call the front 52, of the booth 50 is at the bottom of FIG. 9, while the rear 54 is at the top of FIG. 9. As this is a production style booth, the articles (in this instance flat panels) being painted will be moved into and out of the booth and the paint spraying operation by a conveyor, which in the instance of FIG. 9 will move from the left side (vestibule) 56 to the right side (vestibule) 58. Air will generally be admitted into the booth at the top adjacent the rotary spray 51, at the front of the booth (bottom of FIG. 9), flow past the rotary painting equipment 51 of the booth 50, the articles 59 (middle of FIG. 9) being painted and exit into a cleaning, treatment or eliminator portion 61 at the rear (top of FIG. 9) of the booth. Air will also flow into the booth from the conveyor entrance and exit in the two vestibules sides 56 and 58, respectfully.

Figure 10:
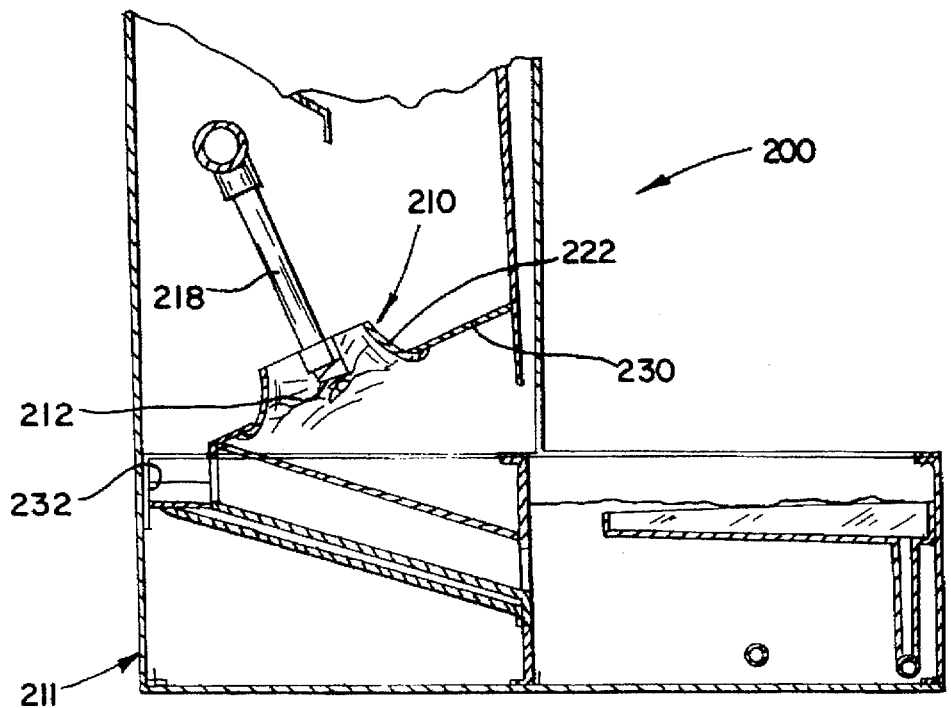
FIG. 10 is a front elevational view of the structure shown in FIG. 9.

Referring now more fully to FIGS. 9 to 13, and particularly FIG. 10, the front element or wall 60 of the booth 50 is generally rectangular and has an access door 62 and an observation window 64 therein. The front wall itself can be formed of one or more sheet metal panels which can themselves be structural and/or supported by separate structural elements, as is conventional.

Figure 11:
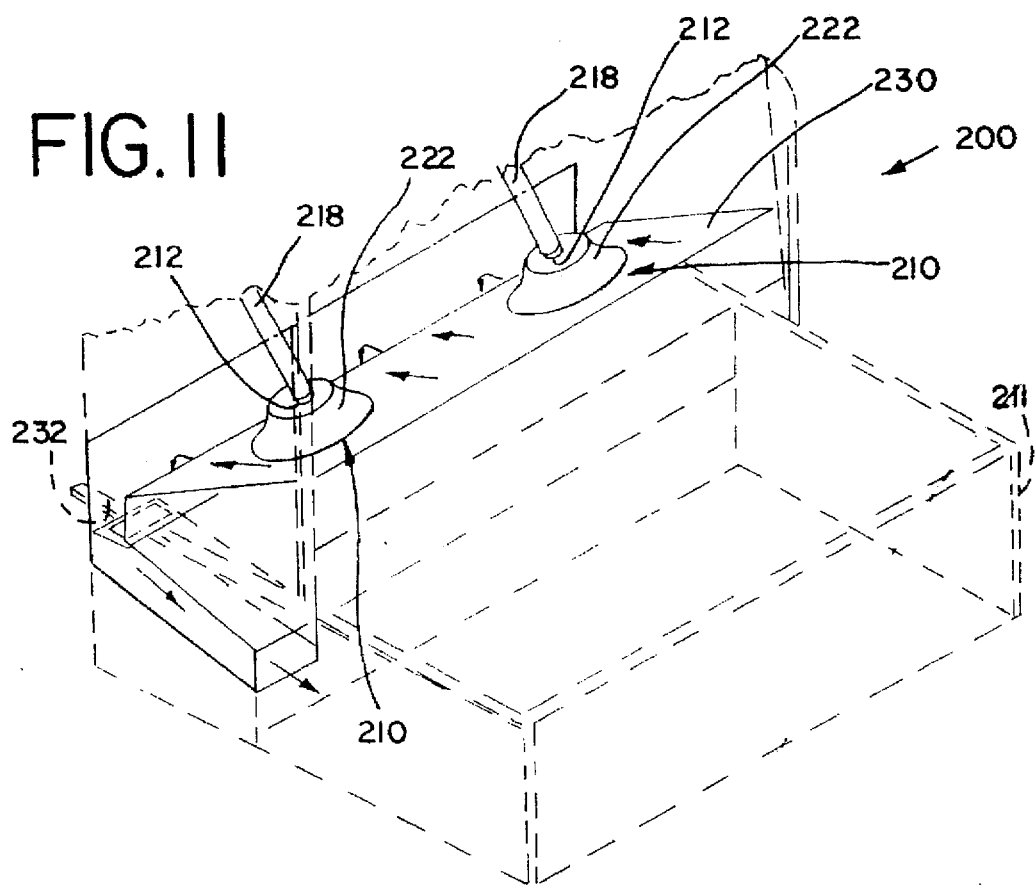
FIG. 11 is a side elevational view of the structure shown in FIG. 9.
Figure 12:
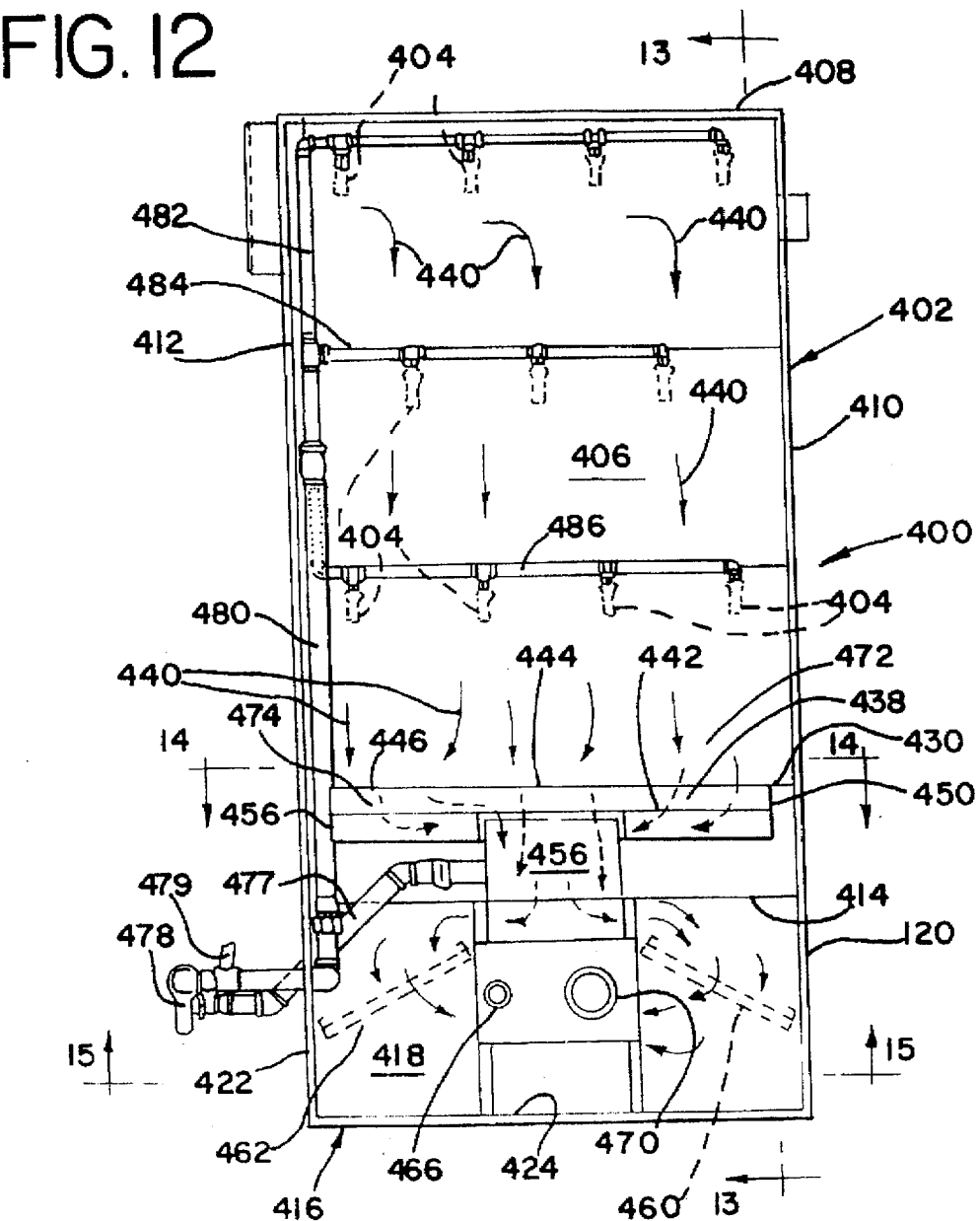
FIG. 12 is a cross-sectional view of the structure shown in FIG. 9 taken along the line 12—12 of FIG. 9.

Referring now to the elements or booth sides 56 and 58, they are to the extent not described differently, similar to one another, and generally mirror images of one another. One such side 56 is shown in FIG. 11, and description of it is sufficient for a person skilled in the art to envision and/or construct the other side 58, which is not shown in full side elevation. It is most important to note that the side 56 or 58 is not constructed at a right angle to the front wall 60. Instead a portion of the wall 56, and in this instance also the wall 58, is at an acute angle (less than 90°) to the front wall 60. While only one of the walls could have been angled, or the floor and/or ceiling of the booth angled, in this instance to help provide symmetry of air flow, both portions 57 and 61 of walls 56 and 58 are angled at about 70 to 75 degrees to the front wall 52 and consequently at an angle of 40 to 30 degrees to each other. As can be seen in FIG. 11, the side 56 also has an access door 70, a conveyor-article entrance opening 72 (side 58 having a corresponding conveyor-article exit opening) and two observation windows 74 and 76. Of course, the conveyor entrance and exit openings are tailored to accommodate the shape of booth, the conveyor and the articles being painted carried by the conveyor. In this instance as the articles being painted are flat panels, the entrance and exit vestibule and openings need only accommodate the flat panels and their carrying conveyor along with a portion of the air used in the booth, and are generally in the form of elongated, horizontal slots. However, to regulate the air flow through these vestibules, dampers or guillotines could be provided to give the desired inflow into the booth and the desired velocity where painting actually occurs. The sides 56 and 58 could be formed of structural sheet metal panels or panels held in place by structural elements (not shown).

As is apparent from FIGS. 10 and 11, the booth 50 has generally a flat floor or element 80 and generally a parallel ceiling element or panel 81 closing to and with the front 60 and sides 56 and 58. Of course, it is within the scope of the present invention to provide other shaped floors or ceilings, such as tapered or curved, to provide the desired decrease in cross-sectional area and accompanying increase in air flow velocity when moving from the front to rear (bottom to top in FIG. 9, relatively speaking, as the booth could have other orientations than as shown in this drawing). Other aspects of the front and side walls and the equipment shown in these views will become apparent from the subsequent description of other portions of the booth and its operation.

As is shown in FIGS. 9 to 13 the booth 50 is provided with an air handling system 90. The system comprises an upper infeed duct 92, which in turn connects to a downwardly extending sheetmetal elbow or corner 94. The elbow 94, in turn connects to a distribution box or header 96 extending across the top front of the booth 50. From the header 96 the air enters through the top or roof of the booth, through a filter bank 95 and/or air directing dampers or vanes 97 and then is turned toward the rear of the booth. The filters help provide an even distribution of air across the cross-section of the booth between the walls 56 and 58 and the floor and ceiling. Additional air will also be drawn into the booth through the two vestibules for the articles being painted and their conveyor.

In this instance, as we noted, the painting equipment is a plurality of rotary paint spray nozzles which are hung above the articles to be painted as is indicated by the numeral 51, and spray generally downwardly in an arc (segment of the rotary wheel on which the guns are mounted and rotate). This rotary equipment is supported by external structural framework outside of the interior of the booth 50. Alternatively, instead of having the rotary spray 51 suspended above the articles to be painted the spray painting equipment and/or painter(s) could also have been located at the front of the booth where the space between the walls 56 and 58 is widest. This alternative arrangement provides room for the equipment to be placed, operated and serviced and it gives the painters or service men room to maneuver. It should be understood that other arrangements of painting equipment could be made for use in booths of the present invention. The middle portion of the booth 50 is the locale or area where the articles (in this instance, flat panels) are to be painted. As the articles pass by on the conveyor, the painting operation (ejection of paint from the rotary painting equipment or guns and its contact with and the deposition on the article being painted) occurs. At the rear of the booth the two elements or sides 56 and 58 continue to taper towards each other to adjoin the cleaning or eliminator section 100 for further collecting and treating the paint overspray generated by the prior painting operation and collected the passing air flow of increasing velocity. As can be seen in the method and booth of the present invention, the eliminator section can be sized one half or less the front width of the booth. This represents a very significant savings as usually the prior an eliminators were of equal width to the front of the booth, and of higher cost. The eliminator section 100 could be conventional or of the type described in copending U.S. patent application Ser. No. 08/201,210, filed Feb. 24, 1994, entitled Improved Paint Spray Booth and which is incorporated herein by reference.

Figure 13:
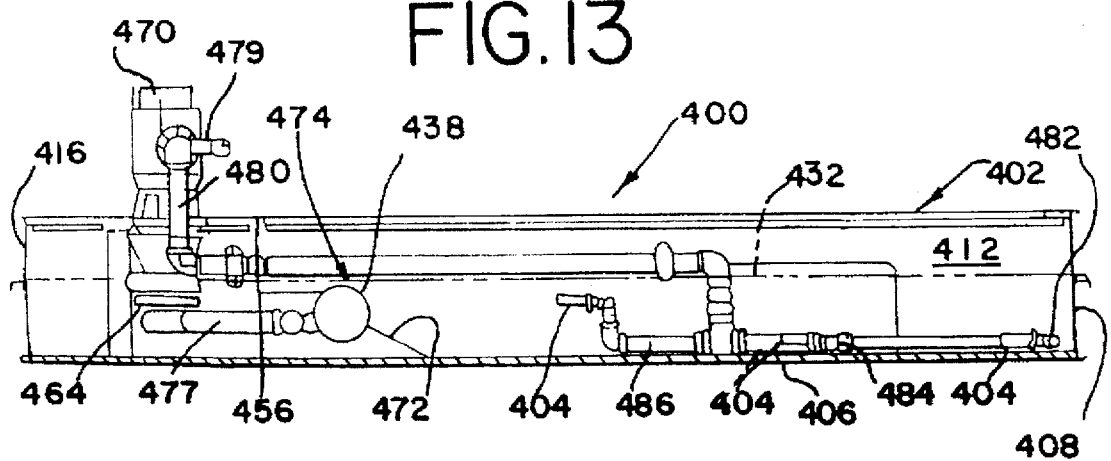
FIG. 13 is a cross-sectional view of the structure shown in FIG. 9 taken along the line 13—13 of FIG. 11.

In order to prevent paint overspray accumulation on the interior rear portion of the walls of the booth and rear portion of the floor, these surfaces are spaced about two feet away. Where that is not possible or they are directly below they are provided with a water wash or water cover. Generally little or no overspray tends to collect on the ceiling surface, front portion of the walls or front portion of the floor as the air flow causes such overspray to flow only in a direction from front to rear and gravity tends to keep it off the ceiling and fall toward the water washed or water covered floor. Of course, this assumes that palm is not intentionally or inadvertently "shot" in the wrong direction. The water wash is generally provided at a backstop wall 102 over which a flood of water flows from a supply trough 103. In this booth the subfloor 104 is flooded with water from a second supply trough 106, flows over an inclined collection sheet 108 and is collected in a third or collection trough 110, 110A, 110B and 110C which is inclined to return the flow to the deep tank 112 (say 1½ feet in depth) which extends to a rear portion 113 from which the water for troughs 103 and 106 is initially taken. As is shown in FIG. 13, water is taken from the skimmer 120 along with collected particulate via pipe 121 for disposal to, for example, a Centri Clean unit (not shown). Clean water is taken by pipe 124 to a pump 126 and supplied to pipes 128 and 130 and respectively to supply troughs 103 and 106. Generally, this elimination section 100, overflow sheet 108, washers, tank 112, etc. incorporate the teachings of the above incorporated Ser. No. 08/201,210 application. Of course, the booth could have also been made to accommodate another return or collection trough on the right or other side to return water to both sides of the tank 112. The tank 112 is located partially under the booth, but preferably, for increased access if space is available, could be located at the rear of the booth. This arrangement preferably incorporates the teaching of the foregoing application Ser. No. 08/201,210, entitled "Improved Paint Spray Booth" and which is fully incorporated herein by reference.

The air flow in the booth adjacent the article being painted which during painting operations will contain overspray is increased or accelerated in velocity due to the decreasing cross-sectional area between the walls 56 and 58 and ceiling, floor interior surfaces, and also particularly the water washed sheet 108, so that it can better handle the additional overspray it is required to carry as it journeys toward the rear of the booth and its elimination section 100.

At the rear of the booth the air carrying the overspray is wetted as by passing through a water curtain off of wall 102 and/or spraying and/or any other means to cause the overspray to drop out of the air and collect in the water. The air then proceeds through the eliminator section 100 containing several baffles 140 to further dry the air and to collect any remaining overspray with the water or droplets falling off the baffles and eventually draining into the tank 112. The cleaned air is then pulled into the exhaust fan 142 which caused the air to flow into the booth in the first place. This cleaned air may then be discharged out of the stack, 144 while the water used to clean it can be treated in accordance with said application Ser. No. 08/201,210 and/or by other means conventionally, known means, most then being returned to the tank 112 for reuse.

Figure 14:
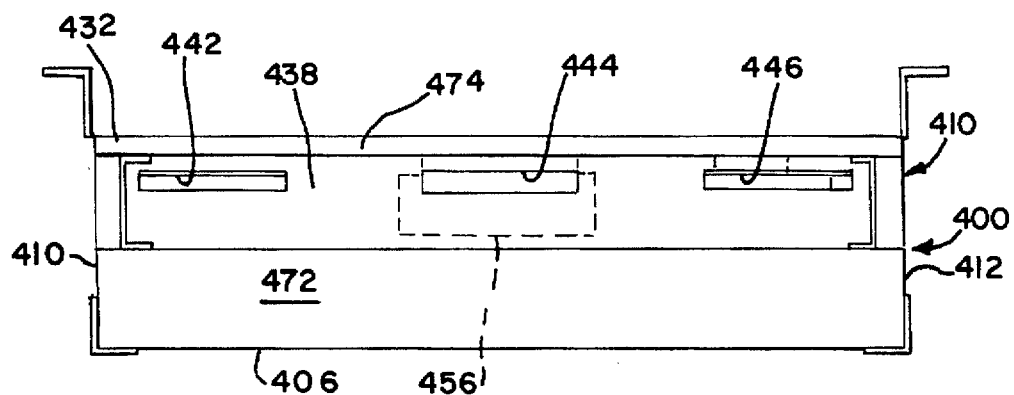
FIG. 14 is a top view of a ninth embodiment of booth structure and method of the present invention.

Referring to FIG. 14, it shows schematically a booth 200 similar to that shown in FIGS. 9 to 13 and has a booth front 202, two tapered side walls 204 and 206 with entrance and exit vestibules (not shown) and an eliminator section 208. The rotary spray unit is depicted at 210. It should be understood the painting operation takes place below the rotary spray unit 210. As is depicted by the arrows 212, 214 and 216, air flows the booth and all the air flow including the two side air flows from the vestibules are very helpful in controlling overspray as they will flow over or at least very closely adjacent to article being painted which passes below the rotary spray unit 210.

Figure 15:
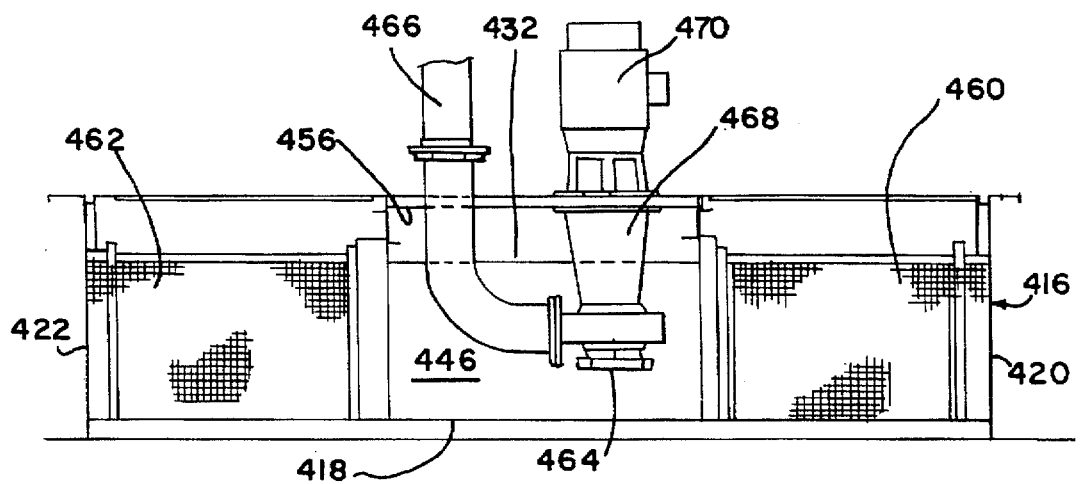
FIG. 15 is a top view of a prior art booth.

A prior art booth 200' for a similar purpose as the booth 200 is shown in FIG. 15. As noted this booth has a rectangular or square make up and its eliminator is the full width of the booth and same width as the front of the booth. For convenience the booth of FIG. 15 will be referred to with prime numerals. Thus, the FIG. 15 booth is 200'. As can be readily seen the side air 212' and 214' now flow into the booth a considerable distance away from the article being painted below the rotary paint unit 210' so that they provide little or no help in controlling overspray. This difference in the way the side air 212 and 214 flows, compared to that for 212' and 214' is a significant advantage of the booth and method of the present invention.

Referring to FIG. 16 it shows a booth 220 similar to FIGS. 9–13 and also FIG. 14, except that the eliminator section is not like that of the Ser. No. 08/201,210 application, but like that shown in the Binks U.S. Pat. No. 4,239,512 and the related U.S. Pat. No. 4,399,742, which patents are hereby incorporated by reference. These eliminators 216 generally comprise a pair of water nozzle venturi units and are designated by the numeral 218. This booth has a front wall 222 with two tapered side walls 224 and 226, with the eliminator 216 at the rear, and a painting unit 225.

FIG. 17 shows a prior art booth 220' similar to FIG. 16 and for convenience will be described with prime reference numerals. As is noted the booth 220' is rectangular of originally and has a front 222' and an eliminator 216' of similar widths. The booth 220' has four water nozzle venturi units 218' instead of just two like in FIG. 16. In the prior all four units 218' would have been used. This prior art booth has been updated and retrofitted with the present invention and is provided with two tapering baffles or wing 224' and 226' which reduce the cross-sectional area of the booth in the locale where painting occurs, beneath painting unit 225'. These baffle elements 224' and 226' are inside the booth's outside side walls 230' and 232', and increase the velocity of the air entering the booth from the front to about double its velocity and permit the retrofitted booth to use substantially less air than the booth previously required, and, in fact, from 40% to 50% to 60% less air. Of course, the baffle elements 224' and 226 could be made movable or adjustable to vary the cross-sectional and velocity changes obtained to optimize painting and paint overspray control. Another advantage of the present invention is that when retrofitted to a booth not all of the prior art eliminator section is needed. In fact, only the two inner units 218' need be operated, while the two outer units 218' need not be operated resulting in significant savings. Of course, in a new booth they need not be built at all.

Referring to FIGS. 18 and 19 they too show a new booth 240 and a retrofitted prior art booth 240' having tapered side walls or elements 242 and 244 or side baffle elements 242' and 244'. It should be understood that the eliminator sections 246 and 246' could be of any type, and if the eliminator has the capacity, when retrofitted not all of the prior art elminator 246' may be needed and may be perhaps idled or even removed.

It is believed that the construction and method of operation of the embodiment of the booths just described are fully apparent to a person skilled in the art from the foregoing description and need not be further explained in detail.

While the embodiment described used an exhaust fan, the concept of the present invention can also be used with a booth wherein the fan or blower was provided at the front of the booth to blow air into the booth.

While the embodiments shown generally would be considered cross-flow booths, that is the air flows generally horizontally in the booth, the present invention is also useable in and with downdraft type booths. In such a booth, say for automotive use wherein the roof of the vehicle is usually painted first, the booth would be wider in cross-section at the top and narrow or taper inwardly to a smaller cross-section moving in a downwardly direction.

While the several embodiments discussed were water booths, the method and booth of the present invention could also be used with oil booths and/or dry filter type booths.

While the present invention was discussed in the context of an E booth or Envirotech type booths made by Binks, it is also applicable to the No Pump type booth made by Binks and to other type booths made by others. While several embodiments of the structure and method of the present invention have been described, modifications and equivalent structure, and/or steps will be apparent and are covered by the appended claims.

What is claimed is:

1. A method of painting an article with spray painting equipment in a paint spray booth having an air inlet spaced upstream from the equipment and the article, an air outlet spaced downstream from the equipment and the article and an eliminator section adjacent the outlet, including the steps of:

provxnumbering an air flow in the booth from the air inlet past the equipment and the article, and out through the air outlet and eliminator section, spray painting the article with the equipment and causing the airflow to induce overspray from the painting to flow with the air to the air outlet and into the eliminator section, increasing the velocity of the air flow from a location spaced upstream of the equipment and the article and as it moves past the article to a location spaced downstream from the equipment and the article, and for flow at increased velocity to the outlet, selecting the initial velocity of the air flow in the booth upstream of the equipment and the article to be of a sufficiently high velocity to carry with the air flow any initial paint overspray generated upstream from the equipment and the article, selecting the initial velocity to be at least 50 fpm, decreasing the cross-sectional area of the booth from a location spaced upstream of the equipment and the article to a location spaced downstream from the equipment and the article such that the cross-sectional area at the downstream location is 0.60 or less times the cross-sectional area at the upstream location, causing the air flow in the booth to pass through the decreasing cross-sectional area, increasing the air flow velocity through the decreasing cross-sectional area to a velocity above the initial velocity to control the subsequent overspray generated during spray painting of the article increasing the velocity of the air flow past the article and to said downstream location to a value of about 1.66 or more times its initial velocity, causing air flow at the increased velocity and the paint overspray contained therein to flow through the outlet and into the eliminator section, and cleaning the air of paint overspray in the eliminator section and discharging the clean air from the booth, whereby the air flow velocity in the locale where the painting occurs increases and overspray generated during painting is controlled and the quantity of air flow utilized in the booth can be minimized while still adequately controlling both initial and subsequent overspray and maintaining paint finish quality.

2. The method of claim 1, comprising the step of cleaning the air flow downstream of the article with a water washed floor for collecting overspray.

3. The method of claim 1, comprising the steps of using water to clean the air flow, cleaning paint particulate of the overspray first collected in the air, using the water to clean the particulate from the air, cleaning the particulate from the water, and reusing the water to clean the air.

4. The method of claim 1, wherein the step of painting comprises electrostatic bell painting.

5. The method of claim 1, wherein the step of painting comprises HVLP painting.

6. The method of claim 1, wherein the step of painting comprises air assist airless painting.

7. The method of claim 1, wherein the step of painting comprises airless painting.

8. The method of claim 1, wherein the step of painting comprises air atomization painting.

9. The method of claim 1, wherein the step of painting comprises spray painting.

10. The method of claim 1, wherein the step of painting comprises powder painting.

11. The method of claim 1, wherein the velocity is increased at least to 100 fpm.

12. The method as in claim 1, including the step of flowing the air substantially horizontally across the booth.

13. The method as in claim 1, including the step of flowing the air substantially vertically in the booth in a downward direction.

14. A paint spray booth for painting articles comprising a painting section, means for painting articles in said painting section, means for providing air flow in said painting section, means for enclosing said painting section to contain said air flow, said means for enclosing said painting section having a decreasing cross-sectional area in the direction of air flow in the locale where painting is to occur, said means for enclosing said painting section including wall, ceiling and floor elements, at least one of said elements cooperating with the other of said elements to provide said decreasing cross-section and to cause an increasing air flow velocity in the direction of air flow, an air entrance area spaced upstream of the locale where painting is to occur and an air exit area spaced downstream of the locale where painting is to occur, said air entrance area being greater than said air exit area, said air exit area being adjacent and including paint overspray eliminating means, said means for enclosing said painting section increasing the velocity of the air from that before painting to a value of about 1.66 or more times in the locale of painting, said means for enclosing said painting section reducing the cross-sectional area from that before painting to about 0.60 or less times in the locale of painting, said means for providing air flow providing air at an initial velocity. of at least 50 fpm whereby the air flow in the booth in the locale where painting occurs is of increasing velocity.

15. A paint spray booth as in claim 14, wherein at least two of said elements provide said decreasing cross-section.

16. A paint spray booth as in claim 14, wherein at least three of said elements provide said decreasing cross-section.

17. A paint spray booth as in claim 14, wherein all of said elements provide said decreasing cross-section.

18. A paint spray booth as in claim 14, further comprising water washed surfaces located between said air entrance area and said air exit area.

19. A paint spray booth as in claim 14, wherein said paint spray booth includes wall, floor and ceiling elements, at least one of said elements being relatively tapered toward one of the other of said elements to form said decreasing cross-section.

20. A paint spray booth as in claim 19, wherein said one element is formed by a straight surface.

21. A paint spray booth as in claim 19, wherein at least two of said elements are tapered toward each other in the locale where painting is to occur when moving in a direction from said air entrance area toward said air exit area.

22. A paint spray booth as in claim 19, wherein at least two of said elements are formed by straight surfaces angled toward each other.

23. A paint spray booth as in claim 14, wherein said means for painting comprises electrostatic bell painting means.

24. A paint spray booth as in claim 14, wherein said means for painting comprises HVLP painting means.

25. A paint spray booth as in claim 14, wherein said means for painting comprises air assist airless painting means.

26. A paint spray booth as in claim 14, wherein said means for painting comprises airless painting means.

27. A paint spray booth as in claim 14, wherein said means for painting comprises air atomization painting means.

28. A paint spray booth as in claim 14, wherein said means for painting comprises paint spraying means.

29. A paint spray booth as in claim 14, wherein said means for painting comprises powder painting means.

30. A paint spray booth as in claim 29, including means for recovering the powder.

31. A paint spray booth as in claim 14, wherein the velocity is increased to at least 100 fpm.

32. The method as in claim 14, wherein the air flow in the booth is substantially horizontally across the booth.

33. A paint spray booth as in claim 14, wherein the air flow in the booth is in a downward direction.

34. A paint spray booth as in claim 14, wherein the booth is an automotive vehicle spray booth.

35. A paint spray booth as in claim 14, wherein said booth is an existing booth and means is provided to retrofit said existing booth to lower the total air flow from that of the existing booth and to increase the velocity of the air in the booth from an initial velocity to a greater velocity.

36. A paint spray booth as in claim 35, wherein said means provided is a baffle to reduce the cross-sectional area of the booth.

37. A paint spray booth as in claim 36, wherein said baffle is moveable to adjust its position in the booth and to provide various cross-sectional area changes.

38. A paint spray booth as in claim 14, wherein said booth has an interior height dimension in the locale where painting occurs, and said air entrance area is of a width more than twice said interior height dimension.

39. A paint spray booth as in claim 14, wherein said booth has an interior height dimension in the locale where painting occurs, and said air exit area is of a width greater than said interior height dimension.

40. A paint spray booth as in claim 39, wherein said air entrance area is of a width more than twice said interior height dimension.

41. A paint spray booth as in claim 40, wherein the cross-sectional area at said air entrance area is more than twice the cross-sectional area in the locale where painting occurs, and the cross-sectional area at said air exit area is less than the cross sectional area in the locale where painting occurs.

* * * * *

UNITED STATES PATENT AND TRADEMARK OFFICE
CERTIFICATE OF CORRECTION

PATENT NO. : 5,741,178
DATED : April 21, 1998
INVENTOR(S) : Steve E. Telchuk

It is certified that error appears in the above-identified patent and that said Letters Patent is hereby corrected as shown below:

Column 2, Line 10, Delete "a" before "optimum"
Column 6, Line 34, Delete "1eft" and insert therefor --left--
Column 8, Line 55, Delete "palm" and insert therefor --paint--
Column 9, Line 34, Delete "dean" and insert therefor --clean--
Column 9, Line 45, Insert --into-- after "flows"
Column 10, Line 8, Delete "of" after "rectangular"

Signed and Sealed this

Twenty-fifth Day of August, 1998

*Attest:*

BRUCE LEHMAN

*Attesting Officer*  Commissioner of Patents and Trademarks